(12) United States Patent
Harada et al.

(10) Patent No.: US 6,401,878 B1
(45) Date of Patent: Jun. 11, 2002

(54) BRAKE BAND

(75) Inventors: Yoshihisa Harada; Hirofumi Nakagomi, both of Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 08/967,023

(22) Filed: Nov. 10, 1997

(51) Int. Cl.⁷ .............................................. F16D 51/00
(52) U.S. Cl. ................... 188/77 R; 188/77 W; 188/259
(58) Field of Search ........................... 188/77 R, 77 W, 188/259, 261, 264 B

(56) References Cited

U.S. PATENT DOCUMENTS

| | | | | |
|---|---|---|---|---|
| 1,286,171 A | * | 11/1918 | Cory | 188/259 |
| 3,300,353 A | * | 1/1967 | Hernick | 188/261 |
| 5,076,882 A | * | 12/1991 | Oyangi et al. | 159/154 |
| 5,467,849 A | * | 11/1995 | Nakagomi et al. | 188/77 W |
| 5,474,158 A | * | 12/1995 | Fukasawa | 188/77 R |
| 5,582,274 A | * | 12/1996 | Umezawa | 188/77 W |

* cited by examiner

*Primary Examiner*—Paul N. Dickson
*Assistant Examiner*—Robert A. Siconolfi
(74) *Attorney, Agent, or Firm*—Crowell & Moring LLP

(57) ABSTRACT

A brake band comprises a strap and a lining bonded on an inner peripheral surface of the strap. The lining is provided in a surface thereof with at least one oil groove formed under compression to a predetermined depth.

2 Claims, 3 Drawing Sheets

BRAKE BAND

BACKGROUND OF THE INVENTION

1) Field of the Invention

This invention relates to a brake band suitable for use in a transmission or like of a vehicle such as an automobile, an agricultural machinery or a construction machinery.

2) Description of the Related Art

In an automatic transmission, multiplate clutches, brake bands and the like are used to effect speed changes by causing an input element such as a gear train to engage or by releasing the same. Of these, brake bands are widely used for their preferred characteristic that, even if the same acting force is applied to a drum, their braking force differs depending on the braking direction of the drum and smooth up-shifting is feasible.

A fundamental construction of a brake band is illustrated in FIG. 3. The brake band, which is generally indicated at numeral 7, is formed of a curved strap 3 made of a thin steel plate. Brackets 4,4' are connected to opposite end portions of the strap 3, respectively. A porous thin friction material (lining) 2 is bonded with an adhesive on an inner peripheral surface of the curved strap 3.

Of these brackets, the bracket 4 is an apply-side bracket on which hydraulic pressure for actuating the brake acts, whereas the bracket 4' is an anchor-side bracket.

To improve the oil discharge characteristic between the drum and the lining in the course of a binding operation of the brake band in such a band brake, the lining 2 may be provided with an oil groove 5, which may in turn be provided with oil discharging apertures 6.

The action of the brake band will next be described in short with reference to FIG. 4. The brake band encircles a drum 1. When it is desired to actuate the brake, hydraulic pressure is applied as indicated by arrow P to the bracket 4 on an apply side to bind the brake band. Designated at 4' is the anchor-side bracket on an opposite end, that is, on a support side.

A direction of rotation of the drum indicated by arrow L in the drawing is called a "leading direction", while a direction of rotation in its opposite direction is called a "trailing direction".

If the arrangement of the oil groove 5 and the oil discharging apertures 6 is not appropriate and the discharging function of the brake band for an oil film existing between the drum and the lining in the course of binding of the brake band is low, the brake band exhibits a low friction characteristic especially during an initial period of binding in which the pressing force is low. This leads to slipping tendency in an initial stage of binding and then to a sudden increase in binding force in a final stage of binding, resulting in an increased shift shock. If the discharge of oil is excessive conversely, starting friction torque in the initial stage of binding becomes large and the shifting performance is deteriorated. Accordingly, a variety of ideas have been proposed with respect to the arrangement of an oil groove and oil discharging apertures.

Further, when a drum is rotating in a leading direction, a surface pressure applied on the anchor side end is generally at least twice as much as a surface pressure applied on the apply side. More heat is therefore produced on the anchor side especially when the brake band is used at elevated temperatures where the viscosity of oil becomes lower. This makes it impossible to maintain an oil film on the anchor side. The brake lining is therefore caused to burn out little by little at its surface. As the brake lining is longer, greater torque is produced in the initial stage of binding, thereby causing an increase in shift shock.

To cope with the above-mentioned problem, an arrangement of oil grooves and oil discharging apertures such as that shown by way of example in FIG. 5 has been invented. In this drawing, a left-hand end of a lining 2 is shown as an apply side whereas its right-hand end is indicated as an anchor side (which are designated as AP and AC, respectively). In the illustrated example, apply-side oil grooves 8 are provided with oil discharging apertures 9, respectively. On the other hand, anchor-side oil grooves 8' are not provided with oil discharging apertures and serve as oil reservoirs. This arrangement of the oil grooves and oil discharging apertures not only reduces the amount of oil to be discharged but also provides oil reservoirs in the vicinity of the anchor-side end while minimizing a reduction in the number (i.e., area) of grooves and discharging apertures as friction surface cooling means to as great as an extent as possible.

The arrangement shown in FIG. 5 is an example, and a variety of arrangements are being adopted depending on the purpose and manner of use of the brake band.

It has heretofore been the practice to concurrently conduct the formation of oil grooves by punching on a press or by cutting with a laser or a cutter in the course of fabrication steps of a lining prior to bonding the lining onto a. strap, that is, in the course of steps comprising impregnating a green paper sheet with a resin, drying the thus-impregnated green paper sheet, heating the thus-dried green paper sheet to form a lining paper sheet, and then cutting the lining paper sheet in a product size. Thereafter, the lining is bonded onto the strap, which is made of a thin steel plate or the like, with an adhesive, whereby a brake band is completed.

In such a conventional brake band, a lining 2 is bonded on a strap 3, and grooves 8 have been formed by punching or the like, as shown in FIG. 6. A resin film is formed on a surface of the lining 2. According to the conventional formation of the grooves by punching, however, the surface resin film and fibers of the lining are both cut off as can be seen from FIG. 6.

As a result, oil tends to leak out through interstices between cut fibers in cut side walls 81 of each groove 8 when the brake band is pulled tight to apply braking force, thereby failing to form a sufficient oil film and hence resulting in the occurrence of a shift shock. Even when friction surfaces are supplied with oil overflowed from the grooves, upper corner portions 82 of each groove are formed into acute edges when the lining 2 is brought into contact with the brake drum 1 (see FIG. 4). This involves a potential problem that the upper corner portions 82 may cut off a flow of oil supplied from the corresponding groove to the friction surfaces. Moreover, with the oil grooves extending through the lining, it is difficult to produce sufficient oil film pressure under the supply of lubricating oil in a small quantity. Cutting of an oil film leads to a problem that starting friction torque becomes higher in the initial stage of tightening of the brake band and a shift shock is hence produced.

SUMMARY OF THE INVENTION

With the foregoing in view, the present invention has a primary object thereof the provision of a brake band comprising a strap and a lining bonded on an inner peripheral surface of the strap, wherein the lining is provided in a surface thereof with at least one oil groove formed under compression to a predetermined depth.

Since the oil groove has been formed under compression in the lining of the brake band according to the present invention, fibers of the lining are not cut off around the oil groove. Oil is therefore prevented from leaking out of the lining through side walls of the oil groove. Further, the depth of the groove can be chosen as desired.

Preferably, upper corner portions of the oil groove can be formed into curved surfaces. This makes it possible to avoid the problem that a flow of oil may be cut off when the brake band is pulled tight to apply braking force.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE INVENTION AND PREFERRED EMBODIMENTS

Figure 1:
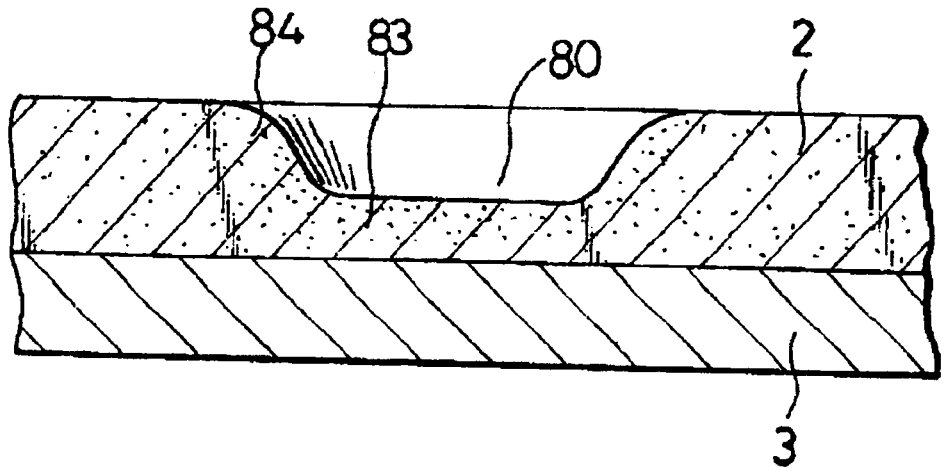
FIG. 1 is a fragmentary cross-sectional view of a brake band according to a first embodiment of the present invention.

FIG. 1 shows the first embodiment of the present invention, in which each oil groove 80 in a lining 2 has been formed under compression instead of by cutting. Accordingly, a surface resin layer of the lining 2 is not cut off but extends continuously around each oil groove 80. Further, a fiber layer of the lining 2 is not cut off in side walls of each oil groove 80. Owing to the formation of each oil groove 80 under compression, the lining 2 has a higher fiber density in a portion 83 surrounding each oil groove 80, thereby assuring retention of oil.

As each oil groove 80 has been formed under compression rather than by cutting, upper corner portions 84 of each oil groove 80 can be formed into curved surfaces having a large radius. By varying the degree of the compression depending on use conditions of the brake band, it is possible to set the depth of each oil groove at a desired value.

Figure 2:
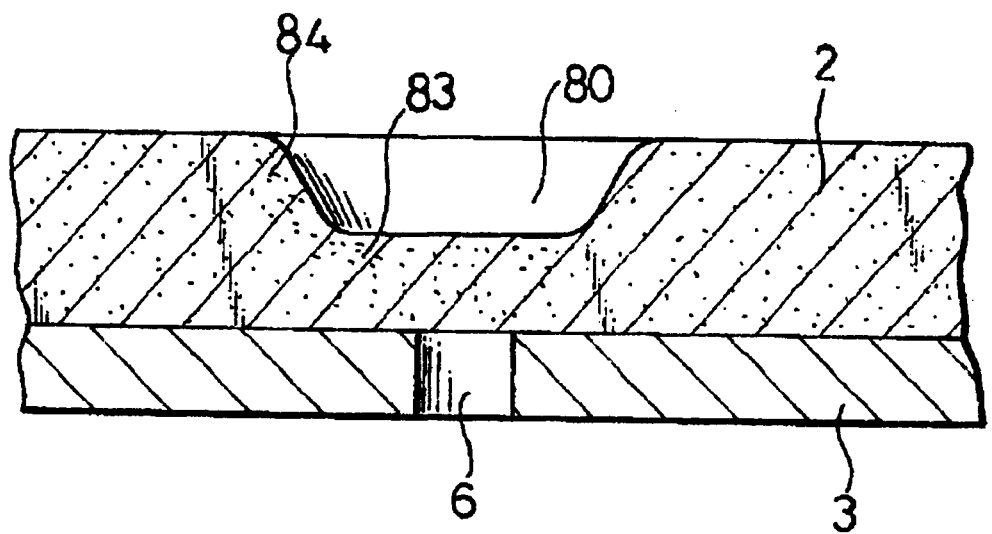
FIG. 2 is a fragmentary cross-sectional view of a brake band according to a second embodiment of the present invention.
Figure 3:
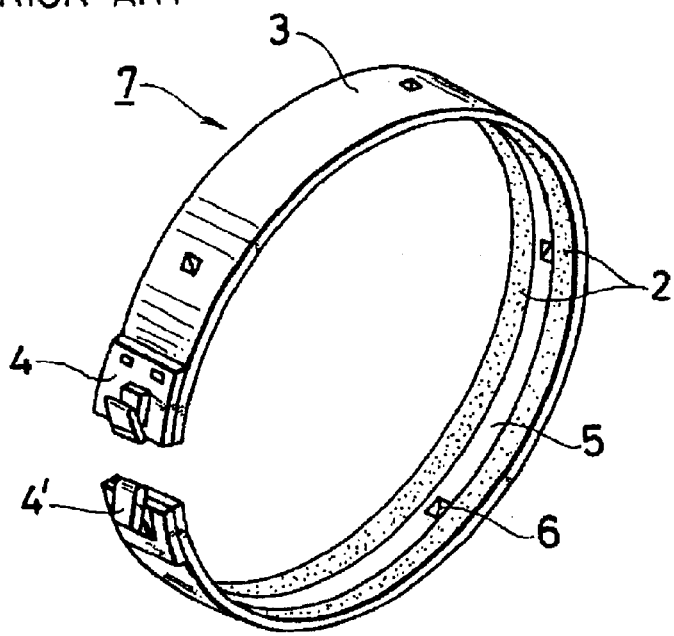
FIG. 3 is a perspective view of a conventional brake band, which illustrates its basic construction.

FIG. 2 illustrates the second embodiment of the present invention. An oil film pressure becomes higher at a location where a high surface pressure is produced. A lining therefore tends to slip at such a location. A strap is therefore provided at such a location with an oil discharging aperture 6 formed therethrough, so that the discharge of oil can be controlled.

Figure 4:
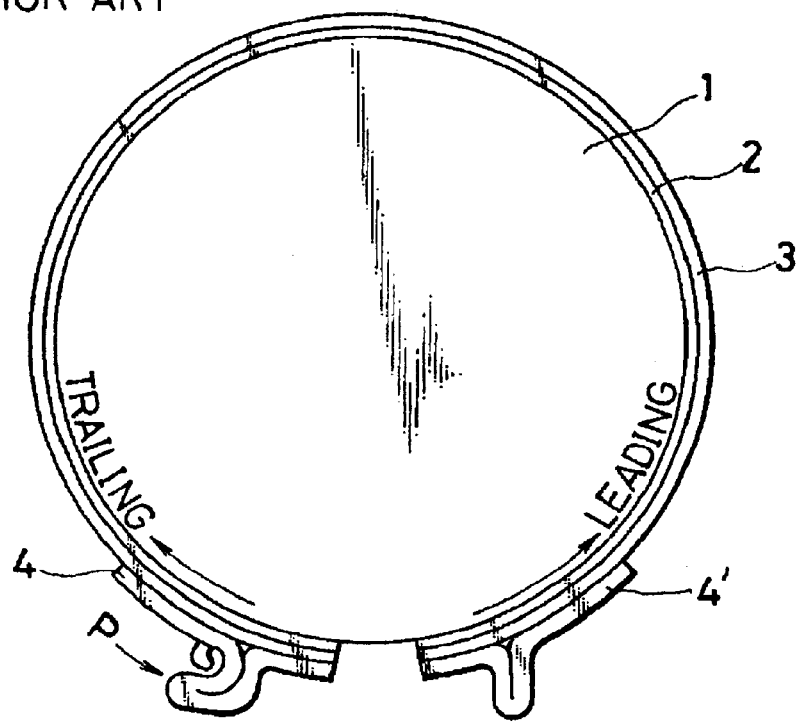
FIG. 4 is a side view of the conventional brake band, which illustrates its action.
Figure 5:
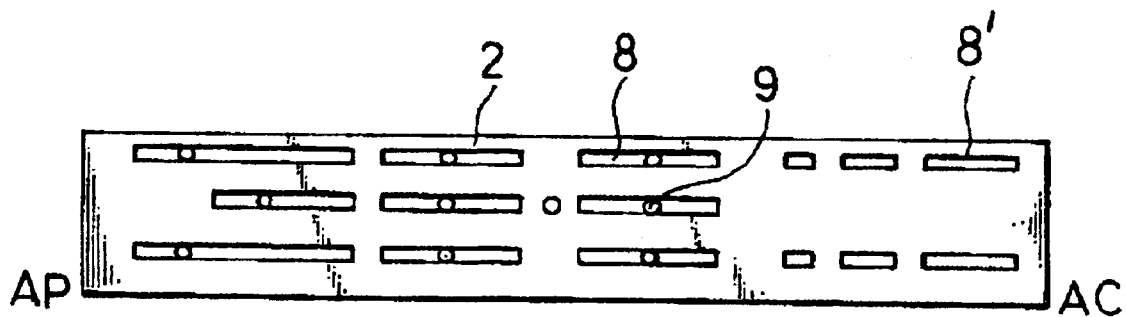
FIG. 5 is a development of a brake lining of an other conventional brake band, which depicts an example of an arrangement of oil grooves.
Figure 6:
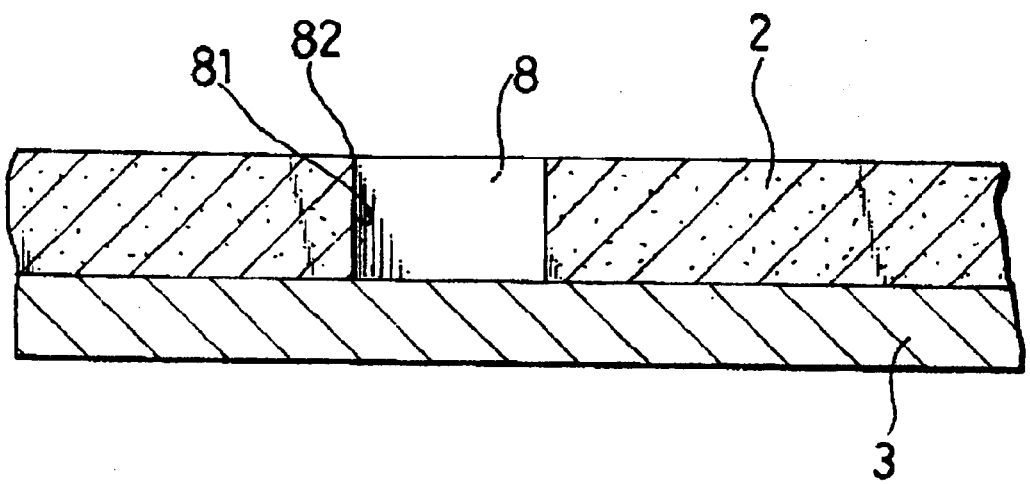
FIG. 6 is a fragmentary cross-sectional view of the conventional brake band of FIG. 5.

When the drum 1 is rotating in the leading direction (see FIG. 4), a higher surface pressure is produced on the anchor side. Accordingly, anchor-side oil grooves are formed deeper and/or are arranged in a greater number.

What is claimed is:

1. A brake band comprising a strap and a lining bonded on an inner peripheral surface of said strap, and a groove formed under compression in said lining, said groove having a bottom surface at a predetermined height above said inner peripheral surface of said strap, and oil discharging apertures arranged extending through said strap from said inner peripheral surface to an outer peripheral surface thereof in registration with said bottom surface of said groove such that a quantity of oil retained in said groove upon binding said brake band is adjustable.

2. A brake band according to claim 1, wherein said groove is provided with upper corner portions which are formed as curved surfaces having a large radius, respectively.

* * * * *